United States Patent [19]

Burkhardt, Jr. et al.

[11] Patent Number: 5,142,683
[45] Date of Patent: Aug. 25, 1992

[54] INTERCOMPUTER COMMUNICATION CONTROL APPARATUS AND METHOD

[75] Inventors: Kenneth J. Burkhardt, Jr., Quakertown; Jay L. Gerbehy, Califon; Theodore J. Skapinetz, Bloomsburg; Patrice M. A. Bermond-Gregoire, Sommerville, all of N.J.

[73] Assignee: Unisys Corporation, Blue Bell, Pa.

[21] Appl. No.: 771,889

[22] Filed: Oct. 7, 1991

Related U.S. Application Data

[63] Continuation of Ser. No. 63,384, Jun. 18, 1987, abandoned, which is a continuation-in-part of Ser. No. 23,316, Mar. 9, 1987, Pat. No. 4,866,664.

[51] Int. Cl.⁵ .............................................. G06F 13/14
[52] U.S. Cl. ............................... 395/725; 395/200; 395/275; 395/325; 395/228.5; 395/228.8; 395/229.2; 395/240.1; 395/241.1; 395/241.7
[58] Field of Search ... 364/200 MS File, 900 MS File, 364/DIG. 1, DIG. 2; 395/200, 275, 325, 725

[56] References Cited

U.S. PATENT DOCUMENTS

| | | | |
|---|---|---|---|
| 4,365,294 | 12/1982 | Stokken | 395/325 |
| 4,402,046 | 8/1983 | Cox et al. | 364/200 |
| 4,404,628 | 9/1983 | Angelo | 364/200 |
| 4,488,231 | 12/1984 | Yu et al. | 364/200 |
| 4,494,185 | 1/1985 | Gunderson et al. | 364/200 |
| 4,536,838 | 8/1985 | Ringel et al. | 364/200 |
| 4,564,901 | 1/1986 | Tomlinson et al. | 364/200 |
| 4,769,771 | 9/1988 | Lippmann et al. | 364/200 |
| 4,777,595 | 10/1988 | Strecker et al. | 364/200 |
| 4,835,674 | 5/1989 | Collins et al. | 364/200 |
| 4,851,988 | 7/1989 | Trottier et al. | 364/200 |
| 4,862,354 | 8/1989 | Fiacconi et al. | 364/200 |

OTHER PUBLICATIONS

M. D. Rap et al., Microstandards, IEEE Micro, vol. 6, No. 3, Jun. 1986, p. 1296.
First Annual Phonix Conference on Computers & Communications, Bitner, D. P., Inter-Processor Communication in a Distributed Processing System, 1982, pp. 263-266.

Primary Examiner—Gareth D. Shaw
Assistant Examiner—John C. Loomis
Attorney, Agent, or Firm—Albert B. Cooper; Mark T. Starr

[57] ABSTRACT

Interprocessor message communication and synchronization apparatus and method for a plurality of processors connected to a system bus. The message communication photocol involves utilizing an array of mailbox locations associated with the processors, respectively, and located in common memory accessible to all of the processors. A processor desiring to send a message to another processor inserts the message into its mailbox along with the address of the other processor. The sending processor interrupts the receiving processor which, in response to the interrupt, scans the mailboxes to find the mailbox with its address therein thereby receiving the message. The interrupt is effected by the sending processor broadcasting an input/output write instruction on the system bus along with the address of the receiving processor and a data field representative of the interrupt to be transmitted. Apparatus associated with the receiving processor includes a decoder that responds to the input/output write instruction to enable a register when the address transmitted on the bus matches its address. The enabled register receives the data signals from the bus to set therein the appropriate interrupt signal represented by the data. The stages of the register are connected to the associated interrupt input of the other processor.

12 Claims, 7 Drawing Sheets

REQUEST BLOCK
IPRB

INTERCOMPUTER COMMUNICATION CONTROL APPARATUS AND METHOD

This is a continuation of copending application Ser. No. 07/063,384 filed on Jun. 18, 1987, now abandoned which is a continuation in part of U.S. patent application Ser. No. 23,316 filed Mar. 9, 1987 entitled "Intercomputer Communication Control Apparatus and Method", now U.S. Pat. No. 4,866,664.

BACKGROUND OF THE INVENTION

1. Field of the Invention

The invention relates to intercomputer message communication and synchronization protocol particularly with respect to the implementation of an interface module for coupling a work station to a local area network (LAN).

2. Description of the Prior Art

Intellegent work stations, such as the family of universal work stations manufactured by Unisys Corporation, are becoming ubiquitous in present day office environments. As the number of work stations in the office environment continues to increase, the requirement for efficient mechanisms for communicating between the work stations has also increased. Local area network (LAN) technology has emerged as a potential solution to the problems associated with connecting large numbers of work stations and peripherals via a relatively high speed data path. One of the limitations to the widespread use of LANS has been the cost associated with connecting a work station to a LAN. Such interconnect cost may be as high as $500-$1000 per work station which expense is often unjustified in the office environment.

One solution to the high interconnect cost of LANS in the office environment has been the utilization of a simple, high speed master/slave cluster protocol for effecting inter work station communication. The primary advantage of the cluster approach is the relatively low interconnect cost. The major problem with clustering, however, is that as the number of work stations increases, performance decreases primarily because of the overhead at the master work station assigned the task of managing the cluster. Replacing the master work station with a super-minicomputer may increase the number of work stations supported, but eventually this configuration will suffer from the disadvantages associated with a logical star configuration. In such configurations failure of the cluster or star master work station can result in failure of the entire interconnected network. Additionally the master work station in such configurations is limited to the number of slave work stations that it can support.

Although, as described above, large numbers of peer work stations may be interconnected via a LAN, the interconnect cost per work station is excessive. Additionally when endeavoring to connect a work station to a high speed LAN, the high data transfer rates of the LAN tend to usurp the processing time of the work station processor to the extent that the processor may not have sufficient time remaining to perform required processing tasks. The processor may only have time to service the LAN. This problem is exacerbated if it is desired to connect a plurality of clustered work stations to a LAN. The cluster master work station, which would be connected to the LAN, would be unable to manage the cluster, perform its own processing tasks and service the LAN. A solution to the interconnect problem may be to provide an additional processor in the master work station to serve as a gateway between the master work station and the LAN. The additional processor would preferably operate asynchronously with respect to the master work station processor. Present day message synchronization and control protcols for message transmission between loosely coupled processors are not sufficiently efficient to service a high speed LAN without overloading the message transmission capability between the processors. Interrupt signals transmitted between the processors on an interprocessor bus are often utilized to effect interprocessor synchronization. This arrangement suffers from the disadvantage that large numbers of bus conductors are required, dedicated, respectively, to the various synchronization interrupts as well as to the specific processor interconnections. This disadvantage is exacerbated for configurations having significant numbers of processors connected to the bus.

An additional disadvantage of present day message synchronization protocols arises when two processors endeavor to write to the same memory location. Hardware and software lock mechanism are utilized to prevent destruction of information. A typical lock mechanism utilizes a shared variable that the processors read to determine its availability. If the variable is available the requesting processor locks it and alters it to indicate nonavailability. Other processors endeavoring to write to the location wait on a queue for access. When the accessing processor has completed its task, the shared variable is unlocked and the queued processors are notified that access is available. Locking mechanisms tend to add hardware expense to a system as well as additional undesirable overhead. Locking mechanisms tend to be cumbersome and slow in the management thereof. Locking mechanisms have a further disadvantage that should a processor fail while owning lock, implementation of a mechanism to recover from the failure and release the lock is difficult.

SUMMARY OF THE INVENTION

The invention involves apparatus and method of controlling and synchronizing the transmission of messages between asynchronously operating or loosely coupled computers. The invention is utilized in a LAN interface module that operates to connect a cluster master work station to a LAN thus functioning as a gateway between a local cluster and the LAN. The LAN interface module obviates the above described cost and performance problems associated with interconnecting large numbers of work stations. Preferably the LAN interface module connects to and communicates with the master work station via the work station system bus. In accordance with the invention when a first processor has a message to be transmitted to a second processor across the system bus the first processor issues an input/output (I/O) instruction having an address associated with a message synchronizing interrupt address for the second processor. Means responsive to the I/O instruction generates an interrupt signal for the second processor in accordance with the address. The second processor in response to the interrupt signal recognizes and acquires the pending message. The second processor replies by transmitting an input/output instruction having an address corresponding to an interrupt signal of the first processor. Means responsive to the input/output instruction generates a corresponding interrupt signal to the first processor confirming and synchronizing the message transmission process. This procedure is utilized in transmitting any discrete signal; e.g., an interrupt or other control signal, such as Reset, between processors.

When the first processor has the message to be transmitted to the second processor, it inserts the message into a mailbox location associated therewith in common memory accessible to both processors. The message includes the address of the second processor, a pointer to data to be processed and a function code pursant to an operation to be performed by the second processor. The common memory includes a plurality of mailbox locations corresponding to the plurality of processors connected to the bus. The interrupt awakens the second processor which polls the mailbox locations to find the mailbox having its address therein. In this manner the second processor locates the message intended for it.

DESCRIPTION OF THE PREFERRED EMBODIMENT

Figure 1:
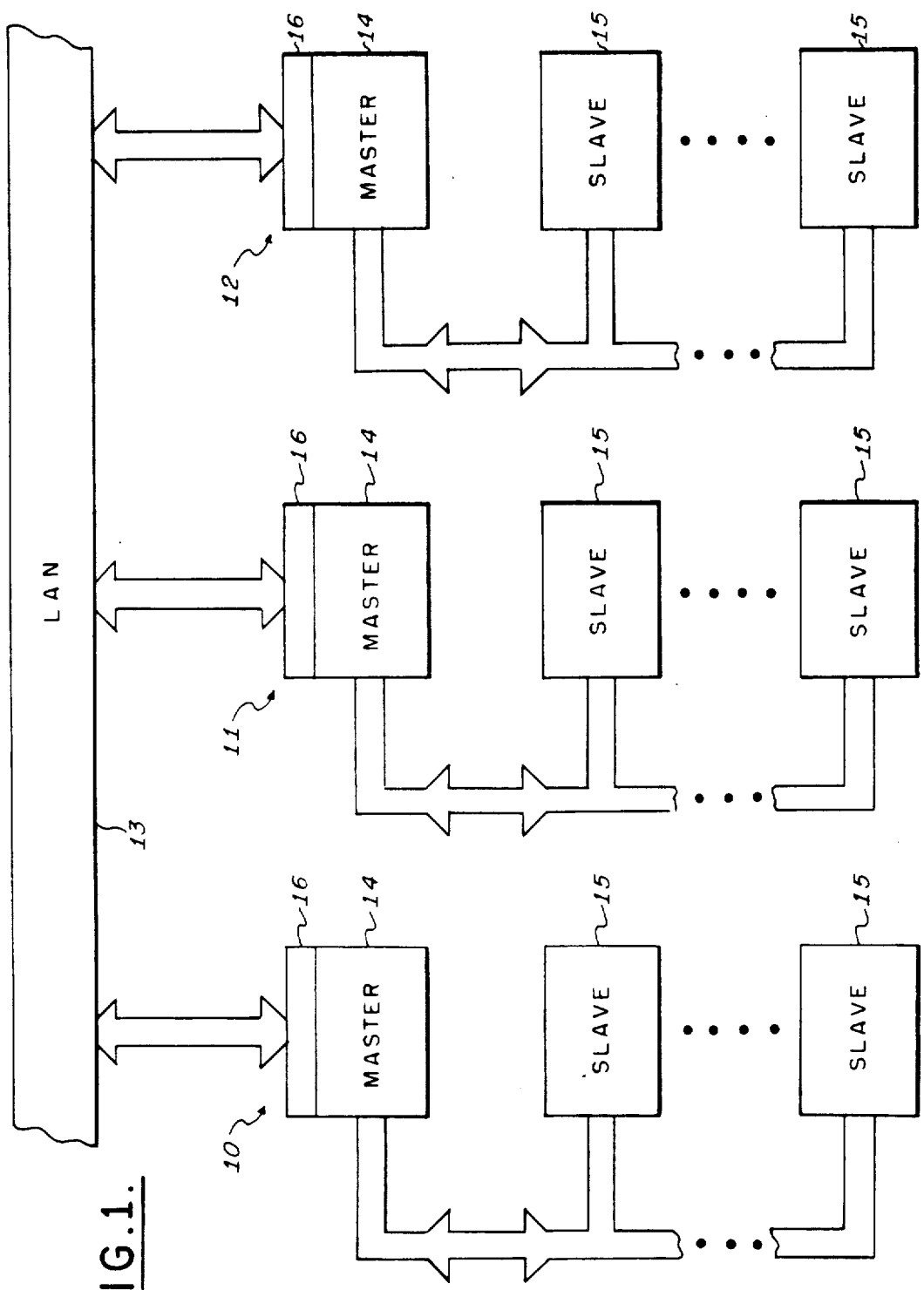
FIG. 1 is a schematic block diagram of plural clustered work stations where each cluster is connected to a LAN via a LAN interface module in accordance with the invention.

Referring to FIG. 1 a typical system topology of clustered work stations communicating via a LAN is depicted. The system of FIG. 1 illustrates three work station clusters 10, 11, and 12 each connected locally via cluster communications and globally via a LAN 13. The LAN 13 may, for example, comprise an 802.3 10 MB CSMA/CD LAN. Each of the clusters 10, 11, and 12 is comprised of a master work station 14 coupled to one or more slave work stations 15 via cluster communications. Each of the clusters 10, 11, and 12 is connected to the LAN 13 via a LAN interface module 16. In the Unisys Corporation family of universal work stations utilizing modular construction, the LAN interface module 16 is connected physically adjacent the other modules of the master work station 14 and couples electrically thereto via the system or work station bus internal to the master work station 14.

Logically any of the slave work stations 15 connected to a master 14 with a LAN interface module 16 can communicate over the LAN 13. The actual physical data path, however, is through each of the cluster master 14. LAN messages can originate in any work station. The actual transmission of messages from the transport layer and below is controlled by a processor and the circuitry in the LAN module 16. Higher levels of the protocol are the responsibility of the main processor within each of the work stations. The main processor in each of the master work stations 14 and each of the slave work stations 15 is, for example, an 80186 class microprocessor with appropriate memory and support logic as well as circuitry for interfacing the 80186 to the other sections of the work station. The message communication synchronization of the present invention is utilized in the system of FIG. 1 in synchronizing message transmission between the main processor of the master work station 14 and an auxilary processor in the LAN interface module 16 in a manner to be described.

Figure 2:
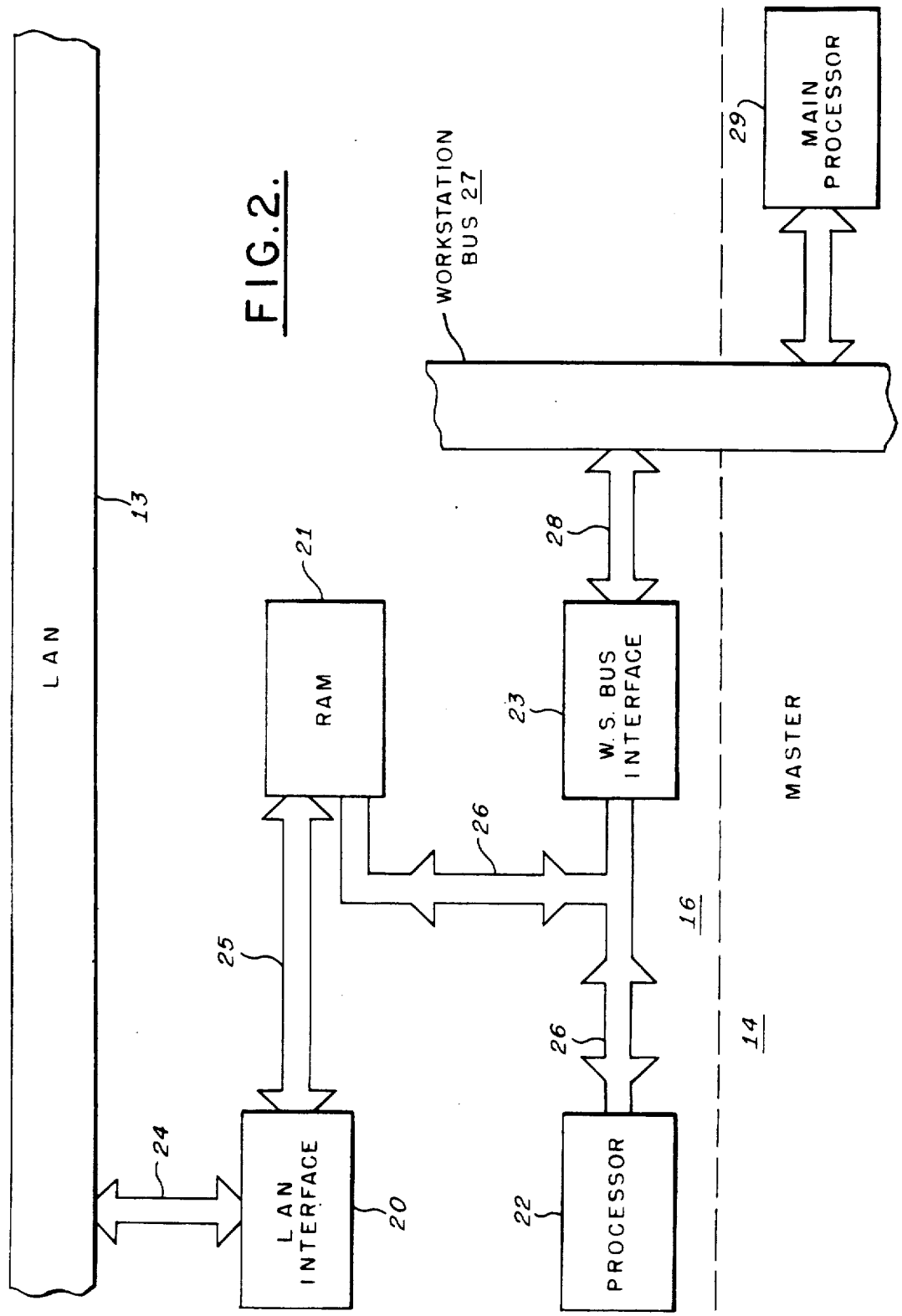
FIG. 2 is a schematic block diagram of details of the LAN interface module of FIG. 1.

Referring to FIG. 2, in which like reference numerals indicate like components with respect to FIG. 1, a schematic block diagram of the sections of the LAN interface module 16 is illustrated. The LAN interface module 16 comprises four sections of logic; viz, a LAN interface section 20, a RAM section 21, a processor section 22, (auxilliary processor) and a work station bus interface section 23.

The LAN interface section 20 couples to the LAN 13 in a conventional manner utilizing a standard bus schematically depicted at 24. When the LAN 13 is an 802.3 standard, the LAN interface section 20 is comprised of industry standard VLSI chips for connecting to the 802.3 LAN. The VLSI components may, for example, include an intel 82586 LAN co-processor, a Seeq 8002 Manchester Encoder and a National Semiconductor 8392 integrated transceiver. The transceiver is coupled to the LAN 13 for two way communication therebetween via the bus 24. The transceiver communicates information from the LAN 13 to the 82586 co-processor. The co-processor communicates with the LAN 13 via the Manchester Encoder and the transceiver. The co-processor in the LAN interface section 20 communicates with the RAM 21 via a bus 25. The RAM 21 is a dual ported RAM with the bus 25 connected to one of the ports thereof.

The LAN interface section 20 operates in parallel with respect to the processor section 22 and the work station bus interface section 23. Communications between the 82586 co-processor of the LAN interface section 20 and the processor section 22 as well as the bus interface section 23 are via buffers in the dual ported RAM section 21. All commands and data to and from the co-processor are transmitted directly through the RAM section 21. Thus once initialized, the 82586 co-processor in the LAN interface section 20 and the processor section 22 operate completely in parallel and messages can be received or transmitted on the LAN 13 regardless of whether or not the processor section 22 is busy.

The RAM section 21, comprising a conventional dual ported RAM and standard support circuitry, has one port thereof coupled to the LAN interface section 20 via the bus 25 and the second port thereof coupled to the processor 22 and the work station bus interface section 23 via a bus 26. Dual ported memory is utilized in the LAN interface module 16 to support simultaneous access to memory by the processor section 22 and the LAN interface section 20. The LAN interface module 16 therefore has the capability to simultaneously receive and process messages from the LAN 13. The RAM 21 is designed with a fairly large capacity to support buffering of a large number of messages in situations where the main processor in the master work station 14 is busy handling other tasks. The design parameters are selected so that no messages from the LAN 13 are missed because of lack of response from the main processor.

The processor section 22 comprises an 80186 class microprocessor with the required memory chips, support logic and buffers for operating and interfacing the 80186 in the processor section 22 with respect to the other sections of the LAN interface module 16. In the system described herein ROM capabilities of the processor section 22 are limited because operational software is downloaded from the main processor of the master work station 14. The processor section 22 is connected for two way information flow to both the RAM section 21 at one of the ports thereof and to the work station bus interface section 23 via the bus 26.

The work station bus interface section 23 receives information from the processor section 22 and the RAM section 21 via the bus 26 and couples to a work station system internal interconnection bus 27 via a bus 28. The internal work station bus 27 couples to the main processor 29 in the master work station 14. The work station bus interface section 23 contains the logic necessary to interface the LAN module 16 to the main processor of the master work station 14 via the internal interconnection bus 27. The work station bus interface section 23 contains apparatus utilized in the transmission of data as well as in the synchronization of the data communication in a manner to be described.

Figure 3:
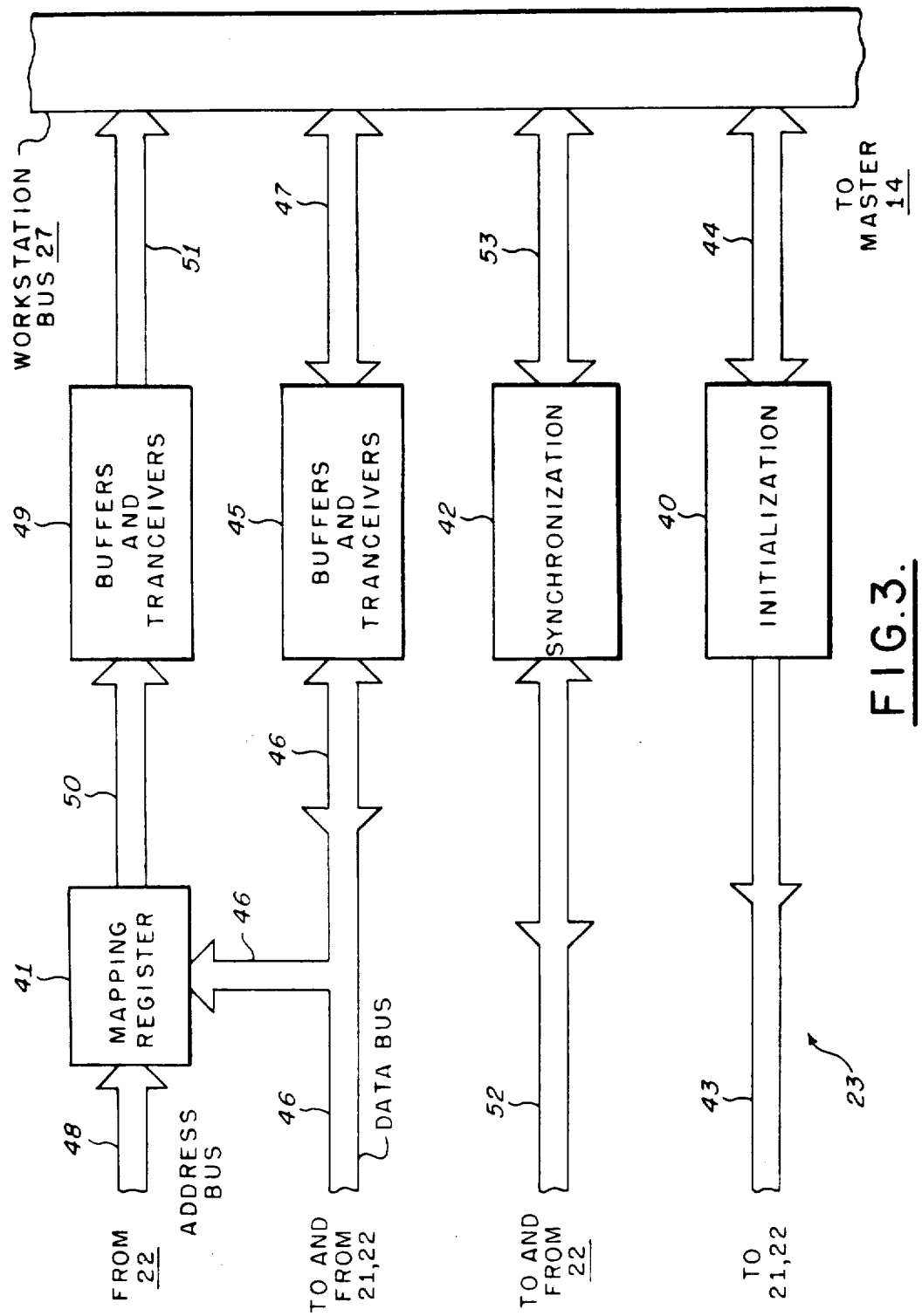
FIG. 3 is a schematic block diagram of the bus interface logic of the module of FIG. 2.

Referring to FIG. 3, in which like reference numerals indicate like components with respect to FIGS. 1 and 2, details of the work station bus interface section 23 of the LAN interface module 16 are illustrated. The work station bus interface section 23 comprises four blocks of logic, viz, module initialization logic 40, memory address mapping register logic 41, multiprocessor synchronization logic 42, and various buffers and transceivers for controlling the movement of data between the LAN interface module 16 and the work station system interconnection bus 27.

The initialization logic 40 communicates with the processor section 22 and the RAM section 21 of the LAN interface module 16 via a bus 43 and with the work station bus 27 via a bus 44. The initialization logic 40 contains conventional hardware that is utilized during start up of the system to set various components thereof into an initial state. The initialization logic 40 also contains standard hardware required to support the soft address protocol of the work station system. When power is applied to the unit, the initialization logic 40 returns a device identification code to the main processor in the master work station 14 via the work station bus 27 and, in response thereto, the main processor defines the addresses to which the LAN interface module 16 will respond. The initialization logic 40 includes the logic required to recognize the soft device addresses sent down from the main processor and to convey these addresses to the module 16 via the bus 43.

Buffers and transceivers 45 are included for controlling the movement of data to and from the processor section 22 and the RAM section 21 of the LAN interface module 16 via a data bus 46. The buffers and transceivers 45 communicate the data to and from the work station bus 27 via a bus 47.

The memory address mapping register logic 41 is a combination of an adder and latches utilized to map local internal memory addresses of the module 16 to the memory address space of the intermodule system bus 27 for transmitting messages and data to other modules located in the master work station 14. Addresses eminating from the processor section 22 are applied to the mapping register logic 41 via an address bus 48 for mapping onto the system address bus. The data bus 46 provides an input to the mapping register logic 41 for loading initial conditions for the address mapping operation. Appropriate buffers and transceivers 49 are included to control the transmission of the mapped addresses via buses 50 and 51 to the work station bus 27.

The multiprocessor synchronization logic 42 communicates with the processor section 22 via a bus 52 and with the work station bus 27 via a bus 53. The synchronization logic 42 is utilized in the synchronization of data transfers across the work station internal bus 27 and the synchronization of communications between the processor section 22 and the main processor of the master work station 14. It is appreciated that the address bus 48, data bus 46 and buses 43 and 52 comprise the bus 26 of FIG. 2. Similarly the bus 28 of FIG. 2 is comprised of the buses 44, 47, 51, and 53. Thus communications between the processor 22 in the LAN module 16 and other processors connected to the work station bus 27, such as the main processor in the master work station 14, are controlled by the interprocessor synchronization logic 42. The logic 42 supports the generation of a hardware reset of the LAN module 16, a nonmaskable interrupt (NMI) at the LAN module 16 and several interrupt requests, for message communication synchronization, at both the LAN module 16 and the main processor in the master work station 14, in a manner to be explained. Details of the synchronization logic 42 will be described with respect to FIGS. 4 and 5.

Figure 4:
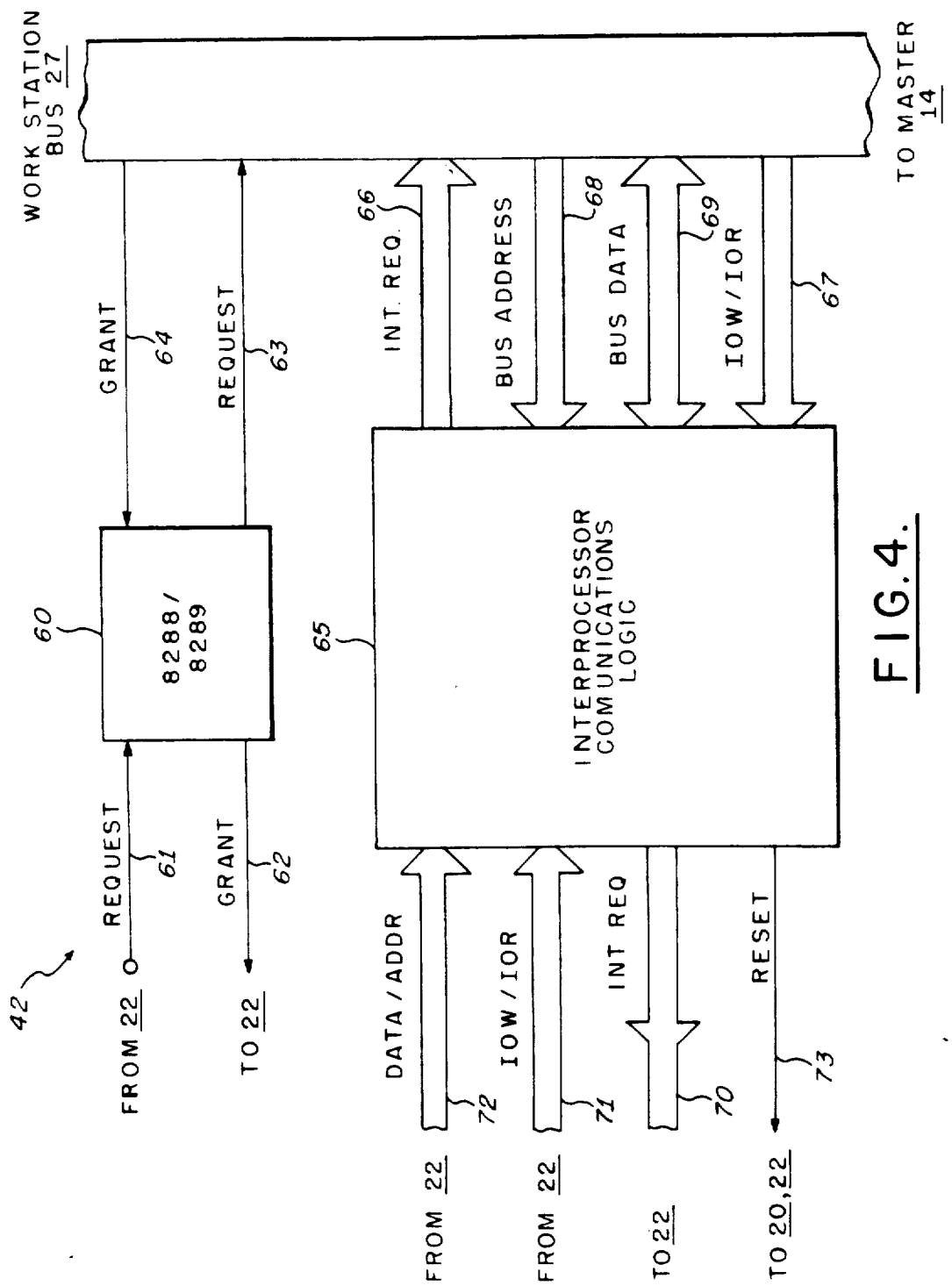
FIG. 4 is a schematic block diagram of the synchronization logic of FIG. 3.

Referring to FIG. 4, in which like reference numerals indicate like components with respect to FIG. 3, a schematic block diagram of the synchronization logic 42 (FIG. 3) is illustrated. The synchronization logic 42 has the capability of synchronizing and controlling message communication among multiple processors connected to the work station system bus 27. Access to the system bus 27 by the processor 22 in the LAN interface module 16 is controlled by a circuit 60 of the Intel 8288/8289 class. The circuit 60 comprises conventional logic to control data transfer across multiple bus systems. The circuit halts instructions or requests that are mapped by the processor 22 to the interconnection bus 27 until the bus has been physically granted to the LAN interface module 16. Specifically the circuit 60 receives a bus request from the processor 22 on a line 61 and acknowledges to the processor 22, by a signal on a line 62, that the bus has been granted. In response to a request signal on the line 61 the circuit 60 provides the request to the bus on a line 63. The circuit 60 receives acknowledgement that the bus has been granted on a line 64.

The LAN interface module 16 (FIG. 2), via the interprocessor communications logic 65, receives three interrupts and transmits three interrupts over the work station system bus 27. In a manner to be described in further detail, interrupt requests to the LAN module 16 are set by issuing an I/O write instruction over the system bus 27 to the base address of the module 16. The same procedure is utilized by the main processor in the master work station 14, or another module connected to the bus 27, to clear the request. Interrupt requests are transmitted over the system bus 27 by locally executing I/O write instructions. These instructions are decoded locally and converted to actual bus requests. Interrupt requests into the module 16 are cleared by local I/O writes. The three interrupts that can be received by the LAN module 16 are NMI, INT 1, and INT 3. INT 1 and INT 3 are interrupt inputs to the processor 22 and are utilized for synchronization of normal message traffic in a manner to be described. The non-maskable interrupt request is utilized for purposes such as bootstrapping the module 16.

The LAN module 16, via the interprocessor communications logic 65, generates an analogus set of interrupt requests; viz, a pseudo NMI line and two general purpose interrupt signals INT 1 and INT 2. The output NMI may be utilized, for example, to inform the main processor in the master work station 14 of any operational problems in the LAN module 16 and INT 1 and INT 2 may be utilized in the synchronization of message transmissions in accordance with the invention.

The status of the interrupt request lines may be monitored by issuing I/O read instructions either locally by the processor 22 or over the system bus 27 from the main processor in the master work station 14.

The interprocessor communications logic 65 provides the interrupt requests to the main processor in the master work station 14 on a bus 66 which connects to the work station system bus 27. The logic 65 receives the input/output write and input/output read signals as well as bus address signals and bus data signals from the work station bus 27 via buses 67, 68, and 69 respectively. The interrupt requests to the local processor 22 from the logic 65 are provided on a bus 70. The I/O write and read instructions as well as data and address signals from the local processor 22 are provided to the logic 65 on buses 71 and 72 respectively. The logic 65 provides an initialization reset command to the LAN interface section 20 and the processor section 22 of the LAN module 16 via a reset line 73. It is appreciated that the buses and lines 61, 62, and 70-73 comprise the bus 52 of FIG. 3. It is further appreciated that the buses and lines 63, 64, and 66-69 comprise the bus 53 of FIG. 3.

Figure 5:
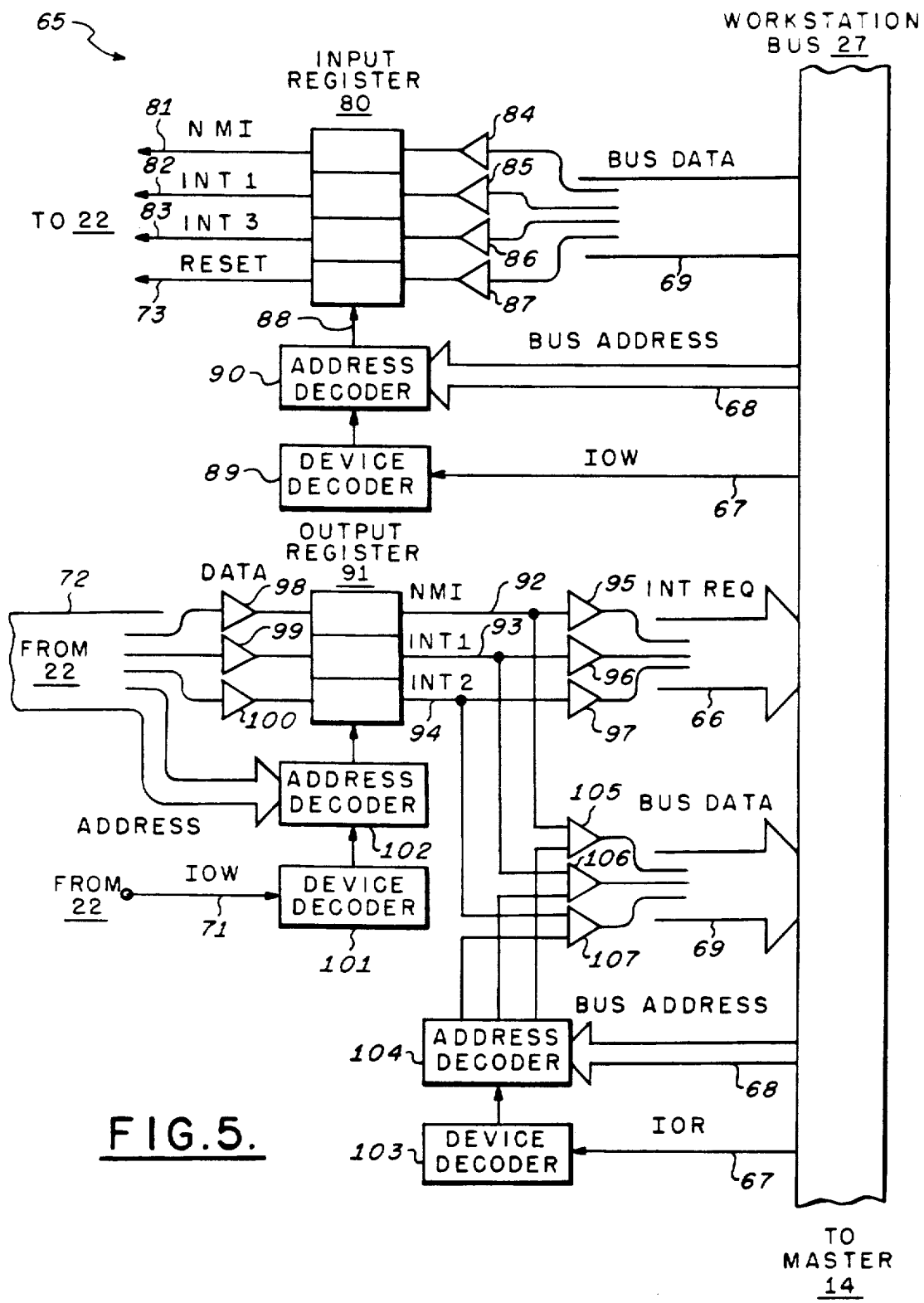
FIG. 5 is a detailed schematic block diagram of the synchronization logic of FIG. 4 implemented in accordance with the invention.

Referring to FIG. 5, in which like reference numerals indicate like components with respect to FIG. 4, details of the interprocessor communications logic 65 are illustrated. The logic 65 includes an input register 80 comprising a plurality of stages for storing the respective plurality of discrete control signals to be sent to the processor 22. As described above, the control signals include the non-maskable interrupt request on a line 81, the INT 1 request on a line 82, the INT 3 request on a line 83 and the Reset request on the line 73. It is appreciated that the lines 81-83 correspond to the bus 70 of FIG. 4. The interrupt requests and the reset request are set into the register 80 by connections to the associated respective data lines on the work station bus 27 via the data bus 69 through respective drivers 84-87. The discrete data signals provided by the drivers 84-87 are set into the register 80 in response to a register enabling signal on a line 88. An I/O write instruction broadcast by the main processor in the master work station 14 on the work station bus 27 is applied on the IOW line 67 to a device decoder 89 which responds thereto. When an I/O write instruction is broadcast, the device decoder 89 enables an address decoder 90. If the address sent down the bus 27 and received at the address bus 68 is the address assigned to the input register 80, the address decoder 90 enables the input register 80 via the line 88.

Thus when the main processor in the master work station 14 desires to send a discrete control signal, such as a message synchronizing interrupt or Reset, to the processor 22, the main processor broadcasts an I/O write instruction on the bus 27, the instruction including the address to which the address decoder 90 is responsive as well as data set to the desired control signal. When the device decoder 89 detects the broadcast I/O write instruction and the address decoder 90 is enable by the appropriate bus address, the input register 80 is enable to receive the data which sets in the desired discrete control signal.

It is appreciated that the main processor may broadcast the I/O write instruction by enabling a line on the bus 27 dedicated to I/O write. Alternatively the main processor may broadcast, on plural lines, the operation code for the instruction. INT 1 and INT 3 may be utilized for the message synchronizing interrupts required by the communications protocol. The Reset control discrete is provided to the processor 22 on the line 73 in the same manner as the message synchronizing interrupts. The message synchronizing interrupts may be of the type where the main processor requests the attention of the auxiliary processor 22 to transmit a message thereto or acknowledges to the auxiliary processor 22 that a message has been received therefrom.

The interprocessor communications logic 65 also includes an output register 91 utilized in sending control discretes, such as interrupts, from the auxiliary processor 22 to the main processor in the master work station 14 over the bus 27. The output register 91 provides discrete control signals NMI on a line 92, INT 1 on a line 93 and INT 2 on line 94. As described above the interrupt signals INT 1 and INT 2 are interrupt inputs recognized by the main processor in the master work station 14 as message synchronizing interrupts. These interrupts are not necessarily the same as the interrupt signals provided by the input register 80 and hence are differently designated. The interrupt signals on the lines 92, 93, and 94 are transmitted to respective lines of the work station bus 27 dedicated to these interrupts and connected to the associated interrupt inputs of the main processor. The interrupt signals on the lines 92, 93, and 94 are transmitted to the corresponding lines of the work station bus 27 by respective drivers 95, 96, and 97 and the interrupt request bus 66. The data for setting the interrupts into the register 91 are provided as part of an I/O write instruction from the processor 22 transmitted over the local bus 72. The data from the bus 72 are inserted into the stages of the register 91 via respective drivers 98, 99 and 100. When the auxiliary processor 22 desires to send NMI, INT 1 or INT 2 to the main processor, the processor 22 issues an IOW command on the line 71 which enables a device decoder 101 responsive thereto. In response to the I/O write command the device decoder 101 enables an address decoder 102 responsive to the address signal on the bus 72 from the auxiliary processor 22. When the auxiliary processor 22 desires to communicate with the output register 91, the I/O write instruction transmitted on the bus 72 contains the address to which the address decoder 102 responds. When the address decoder 102 is energized, the output register 91 is enabled to receive the interrupt data sent with the I/O write instruction on the bus 72.

The interprocessor communications logic 65 is resident in one of the LAN interface modules of the system that includes the auxiliary processor 22. Additional auxiliary processors in, for example other LAN interface modules, may also be connected to the work station bus 27. Since the interrupt lines on the work station bus 27 connected to the main processor in the master work station 14 are unique, any one of the interprocessor communications logic blocks, such as the one illustrated in FIG. 5, may provide the interrupt NMI, INT 1 or INT 2 back to the main processor. A device decoder 103 and an address decoder 104 are included in the logic 65 to permit the main processor to determine from which auxillary processor the interrupt was transmitted. When the main processor receives an interrupt on the work station bus 27, the main processor polls the auxillary processors by broadcasting I/O read instructions containing the addresses of the various output registers. When the device decoder 103 receives the I/O read instruction via the line 67, the decoder 103 enables the address decoder 104. When the address decoder 104 receives the address to which is it programmed to respond, transmitted from the main processor as part of the I/O read instructions on the address bus 68, the address decoder 104 enables drivers 105, 106, and 107. When the drivers 105, 106, and 107 are enabled, the data on the lines 92, 93, and 94 are transmitted to the main processor on the data lines of the work station bus 27 via the data bus 69. The main processor can then examine the interrupt signals from the output register 91 to determine if one of them has been set. In this manner the main processor determines the auxillary processor 22 that originated the interrupt.

In operation when the auxillary processor 22 desires to send a message synchronizing interrupt to the main processor, the auxillary processor 22 generates an I/O write instruction containing the address to which the address decoder 102 responds and the interrupt data to be set into the output register 91. The processor 22 places the I/O instruction on the local bus 26 (FIG. 2) which contains the data/address bus 72 and the I/O write instruction line 71. In response to the I/O write instruction generated by the processor 22, the interrupt to be transmitted to the main processor is set into the output register 91. The interrupt is received by the main processor over the work station bus 27 and the source of the interrupt is identified by the main processor by polling the address decoders 104 by an I/O read instruction. The non-maskable interrupt on the line 92 is utilized primarily to notify the main processor of a failure in the auxillary processor. The interrupt 1 and interrupt 2 signals on the lines 93 and 94 are utilized for normal messaging in the manner described above with respect to the interrupt 1 and interrupt 3 signals on the lines 82 and 83 from the input register 80. For example the auxillary processor may want to inform the main processor that it has completed a task.

Although the invention has been described in terms of an I/O instruction containing an address field designating the target device and a data field designating the particular control discrete to be transmitted, it is appreciated that the address together with the data signal may be considered as an address designating the particular control input port to which the communication is directed. For example if the main processor desires to reset the auxillary processor 22, the main processor broadcasts an I/O write instruction containing an address field that designates the processor 22 as the target and a data field that designates the reset signal. The combination of the address field and the data field may be considered as the address of the reset input to the processor 22.

The above described message synchronization protocol may be utilized in higher level message communication protocols. Data movement may be controlled by providing the processor in control of the bus with the ability to control the movement of data by placing addresses and data on the bus and routing the data to common memory accessible to all processors connected to the bus. Data flow synchronization may be controlled at two levels. At the bus level, access to the bus and the common memory is controlled by higher level system bus arbitration logic and by a common memory controller. At a lower level the movement of messages by different processors is synchronized by providing each processor with the ability to receive and transmit synchronization interrupts over the system bus in the manner described above.

In a conventional manner each of the processors is run by an operating system that controls the performance of various processes. When a process requires a function to be performed by the operating system, it submits a request to the operating system which in turn routes the request to the process capable of serving it. Once the requested function has been completed, the process that has performed the function sends a response back to the originating process to inform it that the operation has been completed. It is appreciated that with this mechanization, the process capable of responding to the request does not have to be resident on the processor that issues the request as long as there is sufficient intelligence within the operating system resident on the processor to route the request.

In the case of multiple masters (a processor in control of the bus) on the same system bus, each processor has two processes (designated as agents) that are responsible for routing messages between processors, the Interprocessor communication (IPC) client and the IPC server. The function of the client agent is to receive requests from processes running on the same processor and to route them to the server agent of the processor where the function is to be performed. The client agent also has the responsibility of returning a response back to the requesting process after the response has been received from the selected processor. The IPC server agent responds to requests by other processors and routes them to the correct processes of the local operating system. It also receives the responses from the local operating system and routes them back to the appropriate IPC client. Thus the service agent receives requests from a client agent on another processor and submits it to the local operating system on behalf of the requestor. It also receives the response from the local operating system and routes it back to the client agent. A client agent always communicates with a service agent and a service agent always communicates with a client agent.

A mailbox mechanism is utilized for physically transmitting messages. Each processor on the system bus is assigned two mailboxes (one for the client agent and one for the server agent) at a predefined address in memory accessible to all of the processors. Thus each agent (client or service) has a mailbox associated therewith which is utilized by the owner agent as an outgoing mailbox into which the agent deposits messages to be delivered to another processor. Each agent (client or service) also has associated therewith a wake-up interrupt accessible over the work station bus 27 which permits other agents to bring to its attention that it is the addressee of a message to be found in the senders mailbox. When a processor is ready to transmit a message, the following operations occur.

1) The client agent wishing to transmit a request to a different processor writes an abbreviated form of the message into its mailbox, specifies the desired processor in an addressee field of its mailbox and then generates an interrupt request to the appropriate server agent by issuing an I/O write command to the address of the attention signal for the appropriate processor. In the case of the LAN interface module 16, the interprocessor communications logic 65 recognizes the appropriate I/O instructions on the system bus for requests coming in and generates the specific interrupts going out for the main processor, as described above.

2) The server agent at the receiver processor determines that it has a request pending by servicing the interrupt request and then scanning all of the mailboxes to determine the source of the request.

3) If the memory of the requesting processor is accessible to the system bus 27, the server will copy the request into the memory space of its processor and release the mailbox entry by clearing the address field.

If the memory of the requesting processor is not accessible to the system bus, the server agent will allocate memory in the common memory area and send a message to the client agent of the requesting processor asking it to copy the message to common memory before proceeding.

4) After the full request has been copied to local (or common) memory, control is passed to the appropriate local process for servicing the request.

5) Once the local process has serviced the request, control is returned to the server agent and if necessary the results of the request are copied to the memory of the requesting processor (either directly if accessible to the system bus 27, or indirectly via the client agent if memory is not accessible to the system bus 27).

6) The server agent then creates a response message in its mailbox and sends an interrupt to the requesting agent informing it that the requested operation has been completed.

For the above described communications protocol to operate correctly several rules should be followed in implementing client and server agents as follows.

1) Processors equipped with memories accessible to the system bus 27 cannot write into memory space when that space is open to access from another processor. For example, once a processor puts a message in a mailbox and assigns a valid addressee code, it cannot modify the contents of the mailbox until the addressee field has been cleared.

2) Processors must copy and clear mailbox information as quickly as possible to avoid tying up communication paths.

Figure 6:
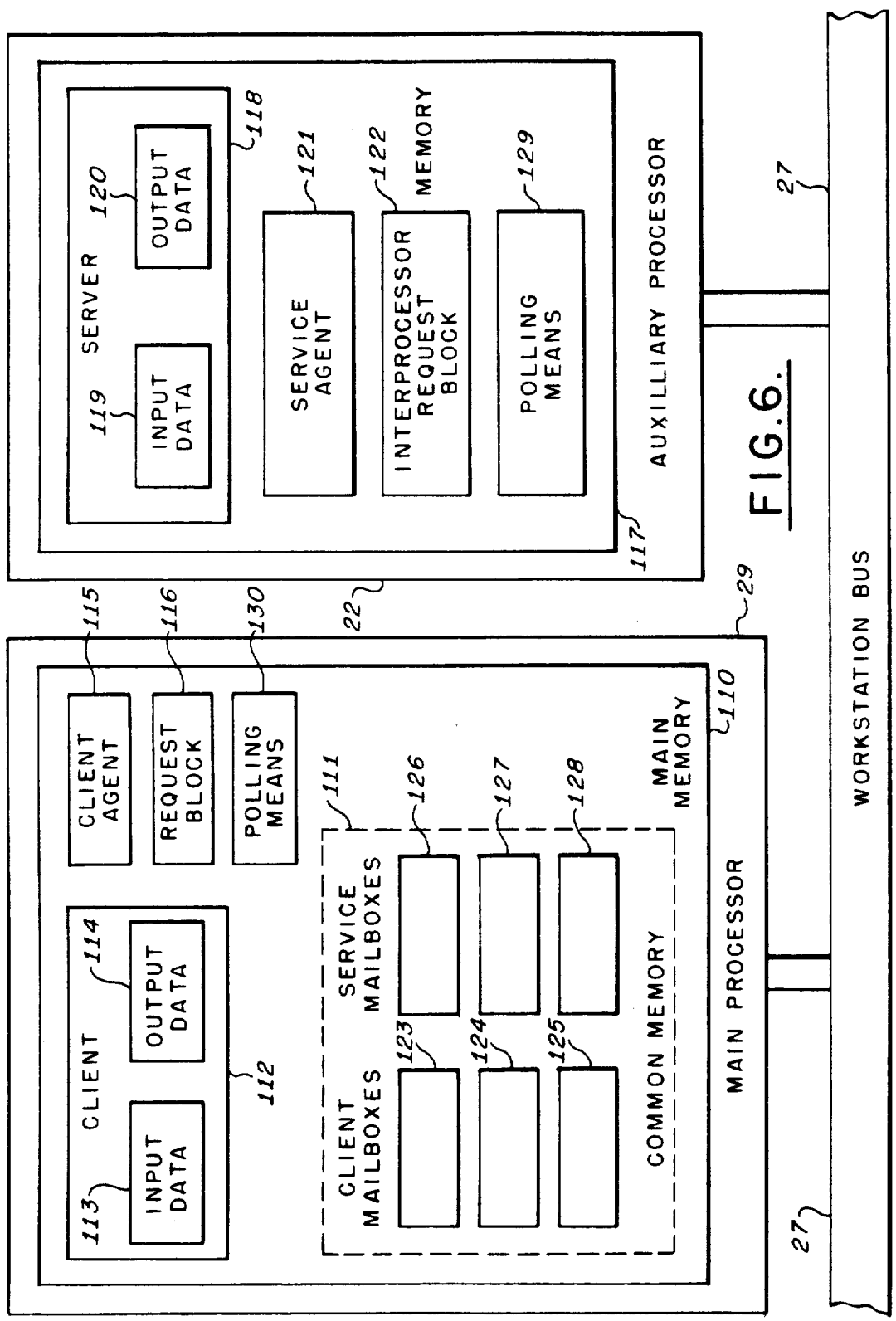
FIG. 6 is a schematic block diagram of two processors interconnected by a system bus configured in accordance with the message communication protocol of the present invention.

Referring to FIG. 6, further specific details of the message communication protocol of the present invention are illustrated. As previously described the main processor 29 and the auxiliary processor 22 are coupled to the work station bus 27 for two way communication therebetween. The main processor 29 includes a main memory 110 that includes a common memory portion 111. The common memory 111 is accessible to the auxiliary processor 22 as well as to any other processor on the work station bus 27. The main memory 110 includes application software denoted as client 112. The client 112 includes storage 113 for input data and storage 114 for output data. The processor 29 includes a client agent 115 for communicating requests for service on a remote processor from any client resident on the processor 29. The requested service may, for example, be available at the auxillary processor 22. When the client 112 sends a request for service to the client agent 115, the client agent establishes a request block 116 utilized in servicing the request. The request block 116 will be explained in further detail hereafter.

The auxillary processor 22 includes a memory 117 storing service (server) software 118. The server 118, for example, may provide the service required by the client 112. The server 118 includes an input data section 119 and an output data section 120. It is appreciated that the processor 22 may include numerous other services. It is further appreciated that both processors 29 and 22 may include multiple client applications and multiple services. The processor 22 includes a service agent 121 to service the server 118 as well as any other services of the processor 22. The client agent 115 communicates with the service agent 121 pursuant to a request from a client resident on the processor 29. The service agent 121 may also communicate with the client agent 115 with respect to responses provided by the requested service resident on the processor 22. It is appreciated that generally each processor will include a client agent for handling the resident clients and a service agent for receiving service requests from remote processors. The client agent 115 may communicate not only with the service agent 121 but also with the service agent of any other processor on the bus 27. In a similar manner the service agent 121 may receive requests from the client agent 115 as well as from the client agent of any other processor on the bus 27. It is appreciated that multiple communications may be in progress simultaneously involving the same agent. In a communication with a client agent the service agent 121 may construct an interprocessor request block (IPRB) 122 in a manner to be explained. The IPRB 122 is similar to the request block 116 of the processor 29.

In order to communicate, each agent of each processor is assigned a mailbox location in the common memory 111 for storing messages to be transmitted to another processor. The mailboxes are organized in an array of client mailboxes and an array of service mailboxes. The mailboxes are indexed by processor. The client array of mailboxes includes mailboxes 123, 124, and 125. The service array of mailboxes includes mailboxes 126, 127, and 128. The mailboxes 123 and 126 may, for example, be indexed to the main processor 29 while the mailboxes 124 and 127 may be indexed to the auxillary processor 22. The mailboxes 125 and 128 may be associated with a third processor (not shown) on the bus 27. The client mailbox 123 is associated with the client agent 115 and the service mailbox 126 is associated with the service agent (not shown) of the main processor 29. The service mailbox 127 is associated with the service agent 121 and the mailbox 124 is associated with the client agent (not shown) of the processor 22. Since all of the mailboxes are located in common memory 111 they are accessible to all of the agents in all of the processors on the bus 27.

In a manner to be described in further detail hereafter each of the mailboxes 123-128 includes an addressee field designating the recipient agent with which an originator agent wishes to communicate. For example if the client agent 115 desires to communicate with the service agent 121 the client agent 115 will deposit in the addressee field of its mailbox 123 the identification of the processor 22. The client agent 115 then sends a wake-up interrupt to the processor 22 utilizing, preferably, the interrupt mechanism hereinabove described. The service agent 121 then scans the client mailboxes 123-125 to located the mailbox containing its address. The service agent 121 utilizes polling means 129 to effect this scanning procedure. The polling means 129 is also utilized by the client agent (not shown) of the processor 22 to scan the service mailboxes 126–128. In a similar manner the processor 29 includes polling means 130 for scanning the appropriate mailboxes in the common memory 111. It is appreciated that any processor on the work station bus 27 can access any of the mailboxes in the common memory 111 for reading and writing.

Figure 7:
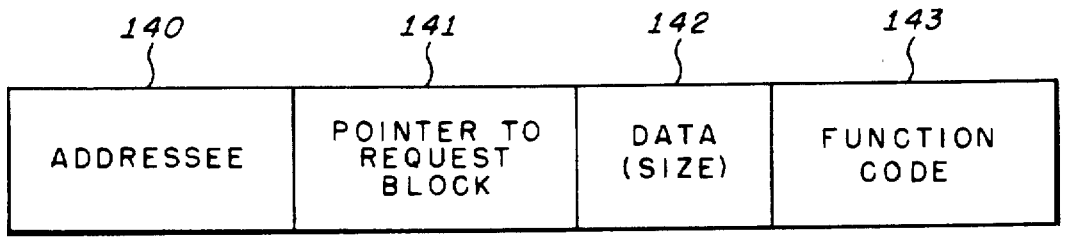
FIG. 7 is a graphical illustration of mailbox location contents in accordance with the invention.

Referring to FIG. 7 the structure of each of the mailboxes 123–128 is illustrated. The mailbox includes an addressee field 140 utilized to store the identification of a message recipient processor. A value in field 140, such as zero, is utilized to indicate that the mailbox is empty. The mailbox also includes a pointer field 141 for storing the address of a request block such as the request block 116 or the IPRB 122. A data field 142 is included to provide the size of a request block for the purpose of memory allocation. The mailbox of FIG. 7 includes a function code field 143 for storing a Type Code indicating the type of message stored in the mailbox and the function or action to be taken by the message recipient.

Figure 8:
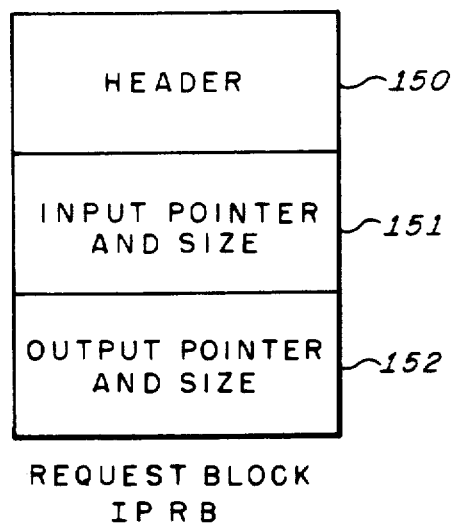
FIG. 8 is a chart of the contents of an interprocessor request block (IPRB) used in the message communication protocol of the present invention.

Referring to FIG. 8, the structure of the request block is illustrated. The request block is the structure that carries requests and responses across the work station bus 27 from process to process. The request block includes a header that includes the size of the other portions of the block, the identification of the request originator and a function code to be performed by the service. The request block includes a section 151 containing a pointer to the input data of the client or the service and the memory size thereof as well as a section 152 containing a pointer to the output data and the memory size thereof. If, for example, the request block is constructed by the client agent 115 pursuant to a request from the client 112, the section 151 will contain a pointer to the input data 113 and the size thereof and the section 152 will contain a pointer to the output data 114 and the size thereof. If, however, an IPRB is constructed by the service agent 121 pursuant to a communication regarding the server 118, the section 151 will contain a pointer to the input data 119 and the size thereof and the section 152 will contain a pointer to the output data 120 and the size thereof.

When the client 112 desires service resident on the processor 22 with respect to data in the output data field 114, the client agent 115 prepares request block 116 with the appropriate entries. The client agent 115 then determines if its mailbox 123 contains a cleared addressee field 140. If the addressee field 140 contains a valid address, the client agent 115 waits until it is cleared. When the addressee field is cleared the client agent 115 deposits a message into its mailbox 123 with the addressee field 140 identifying the service agent 121, the field 141 containing a pointer to the request block 116, the data field 142 containing the size of the request block and a function code in the field 143, to be later described, that notifies the service agent 121 that a new request is being made. The client agent 115 then awakens the service agent 121 utilizing the interrupt mechanism previously described. In response to the interrupt, the service agent 121 scans the client mailboxes 123–125 to find the mailbox or mailboxes containing its address. The service agent 121 then reads the contents of the mailbox into its queue for processing and thereafter erases the addressee field 140 of the mailbox that had contained its message. The mailbox of the client agent 115 is thereby released for other communications. By procedures to be described in greater detail hereinafter, the service agent 121 submits the request to the appropriate server resident on the processor 22 and provides a response back to the client agent by a mechanism similar to that described for the client agent to service agent communication.

Specifically, the function of the client agent is to submit requests from local processes to remote system services. A client agent is activated by receiving either a new request from a local process or by an interrupt from a service agent that is handling a request previously submitted. A client agent is responsive to the following Type Code interrupts: QUERY REQUEST BLOCK, QUERY REQUEST DATA, RESPONSE AVAILABLE, and SUBMIT RESPONSE.

The function of a service agent is to submit to the local operating system, a request from a remote process routed to the service agent by a client agent. The service agent further routes the response back to the client agent. A service agent is awakened by either an interrupt originating from a remote client agent or by a local response to an earlier request. A service agent is responsive to the following Type Code interrupts: NEW REQUEST AVAILABLE, REQUEST BLOCK COPIED, and SUBMIT REQUEST.

The following sets forth the actions performed by the client agent upon the submission of a new request and upon receiving the Type Code interrupts.

Upon receipt of a new request, a client agent computes the size of the request block and stores a pointer to the request block and the size thereof in its mailbox. The client agent then interrupts the appropriate service agent with the Type Code NEW REQUEST AVAILABLE.

When the client agent is interrupted by QUERY REQUEST BLOCK, the mailbox with its identification therein contains a remote pointer to an IPRB. The client agent extracts from the IPRB the pointer to the local request block and copies the entire request block into the IPRB in the remote processor memory. The client agent stores the pointer to the IPRB in its mailbox and interrupts back to the service agent with a Type Code REQUEST BLOCK COPIED.

When the client agent receives the QUERY REQUEST DATA interrupt, the mailbox with its address contains a remote pointer to an IPRB. The associated service agent has allocated memory for all of the input pointers of the request block and has set the pointers to refer to local memory. The client agent now receives a pointer to the local request block and copies each of the data areas pointed to by the request input pointers from the local memory to the areas allocated by the service agent. The client agent then stores the pointer to the IPRB in its mailbox and interrupts back to the service agent with a Type Code SUBMIT RESPONSE.

When the client agent receives the interrupt RESPONSE AVAILABLE, the mailbox with its address contains a remote pointer to an IPRB. The request has been processed and a response is available. The client agent extracts the local pointer to the request block from the IPRB and copies all the data pointed to by the output pointer of the IPRB into the local areas pointed to by the corresponding input pointer of the local request block. The client agent issues the response to the requesting client and stores the pointer to the IPRB in its mailbox and interrupts back to the service agent with the Type Code RESPONSE SUBMITTED.

When the client agent receives the interrupt SUBMIT RESPONSE, the corresponding service agent has performed all of the tasks pursuant to the communication. The mailbox with the address of the client agent contains a pointer to the local request block. The client agent issues a response to the request to the client. Processing of the request is completed and there is no requirement, pursuant to the request, to have further communication with the service agent.

The functions performed by the service agent in response to the interrupts are as follows.

When the service agent receives the interrupt NEW REQUEST AVAILABLE, a new request has been submitted by a client agent and the mailbox with the address of the service agent contains a remote pointer to a request block and the size of that block. From the size data in the mailbox, the service agent allocates sufficient memory to construct an IPRB and stores the identification of the originating processor and the pointer to the original request block. At this point the details of the communication between the service agent and the client agent depends upon the accessibility of the memory of the client to the service agent over the work station bus 27. When the memory of the client is accessible over the bus, the service agent copies the contents of the request block from the client processor into the IPRB at the service processor. For each input pointer in the IPRB the service agent allocates sufficient memory and copies the data from the memory of the client changing the pointer to point to the local copy. For each output pointer, the service agent allocates sufficient memory and changes the pointer to refer to the local location. The request is then submitted to the local service. When the memory of the client is not accessible to the service agent over the bus but the local memory is accessible, the service agent stores the pointer to the IPRB into its mailbox and interrupts the client agent with a Type Code QUERY REQUEST BLOCK.

When a service agent receives the interrupt REQUEST BLOCK COPIED, the client agent has copied the request block to the local memory of the service processor and the mailbox contains a pointer to the local IPRB. The service process allocates memory for each input and output pointer and sets the pointers in the IPRB. If there are output pointers in the request block, the service agent stores the pointer to the IPRB in its mailbox and interrupts the client agent with the Type Code QUERY REQUEST DATA. If there are no output pointers in the request, the service agent submits the request locally.

When the service agent receives the interrupt SUBMIT REQUEST, the client agent has copied the request data into the allocated memory areas and the mailbox contains a pointer to the local IPRB. The service agent then submits the request to the local service process.

With respect to the response to the local service, the service agent extracts the originating processor identification from the IPRB that is being resonded to and continues in one of three ways. When there are no output pointers in the request block, the service agent stores the pointer to the original request block in the mailbox, de-allocates all of the areas pointed to by the request block input pointers, de-allocates the IPRB and interrupts the client agent with the Type Code SUBMIT RESPONSE. When the IPRB includes output pointers and the memory of the client is accessible over the work station bus 27, the service agent copies back the response data to the memory of the client in the areas pointed to by the input pointers in the original request block. The service agent then stores the pointer to the original request block in the mailbox, de-allocates all of the areas pointed to by the request block input pointers, de-allocates the IPRB and interrupts the client agent with the Type Code SUBMIT RESPONSE. When the IPRB includes output pointers and the memory of the client is not accessible over the work station bus 27, the service agent stores the pointer to the IPRB in the mailbox and interrupts the client agent with the Type Code RESPONSE AVAILABLE.

When the service agent receives the RESPONSE SUBMITTED interrupt, the client agent has copied the response data and submitted the response to the originator process. The mailbox contains a pointer to an IPRB. The service agent de-allocates all the memory pointed to by the IPRB pointers and de-allocates the IPRB itself. No reply is necessary.

The following summarizes the sequence of events in communication between agents. The communication is first described where the service agent has access to the client processor memory. The second situation described is where the service agent does not have access to the client agent processor. Multiple events, such as those described are interleaved in real time.

When the client agent receives a request from a client where the service agent has access to the client processor memory, the client agent interrupts the service agent with NEW REQUEST AVAILABLE. In effecting this interrupt the client agent deposits into its mailbox the address of the service agent, a pointer to the request block, the size of the request block and the Type Code NEW REQUEST AVAILABLE. The service agent in response thereto copies the request block, copies the request data, and submits the request to the service. When the service has fulfilled the request, it submits the response to the service agent which copies back the response data into the client memory pursuant to the IPRB pointers. The service agent then interrupts the client agent with SUBMIT RESPONSE. This is effected by the service agent storing in its mailbox the address of the client agent, a pointer to the request block in the client memory and the Type Code SUBMIT RESPONSE. The client agent then provides the response to the client.

When the client agent receives a request from the client where the service agent does not have access to the client processor memory, the client agent interrupts the service agent with NEW REQUEST AVAILABLE by storing in its mailbox the address of the service agent, a pointer to the request block in the client processor memory, the size of the request block, and the Type Code NEW REQUEST AVAILABLE. In response thereto the service agent allocates space in the service memory for the IPRB and interrupts the client agent with QUERY REQUEST BLOCK. This is effected by the service agent storing in its mailbox the address of the client agent a pointer to the allocated IPRB memory space, the size of the space, and the Type Code QUERY REQUEST BLOCK. Since the client processor has access to the service processor memory the client agent copies back the request block into the IPRB allocated by the service processor and interrupts the service agent with REQUEST BLOCK COPIED. In response thereto the service agent allocates memory for the input data and interrupts the client agent with QUERY REQUEST DATA. The client agent copies back to the service processor the requisite data and interrupts the service agent with SUBMIT REQUEST. The service agent submits the request to the service and receives the response back therefrom. The service agent then interrupts the client agent with RESPONSE DATA AVAILABLE. The client agent copies the response data back from the service processor and submits the response to the client. The client agent then interrupts the service agent with RESPONSE SUBMITTED. The service agent de-allocates the data storage space and the IPRB and the communication is completed.

In the present invention when an originating agent desires to send a message to a recipient agent, the originating agent places a message in its mailbox, when the mailbox is empty, setting the address field thereof to the addressee and issuing a wake-up interrupt to the agent to which the message is addressed. If the mailbox is not empty within a predetermined delay interval the addressee of the previous message is declared nonresponsive and an error recovery procedure (not shown) is activated. The awakened agent scans all of the mailboxes of the opposite type and, from each mailbox containing its address, reads and saves the message therein for further processing. The recipient agent then empties the mailbox by resetting the address field. If a processor does not take a message addressed to it within the predefined delay the processor is declared non-functional.

It is appreciated that an originating agent utilizes its mailbox to communicate with plural recipient agents. Therefore a recipient agent must empty a mailbox containing its address as quickly as possible so as to release the mailbox for further use by the originator. The recipient agents queue the messages for subsequent processing. Thus it is appreciated that when two originating agents endeavor to send messages to the same recipient agent, there will not be any interference and no lock mechanism is required since each of the originating agents utilize their own mailboxes for the communication. Since many requests are processed at the same time. the request block unique to each request is utilized so that proper routing and processing is effected for each request.

The above described communications protocol is relatively simple, compared to prior art communications protocols, which facilitates implementation and testing. The communications protocol provides the system with many of the advantages associated with both loosely coupled and tightly coupled multiprocessor systems.

The system exhibits performance normally associated with tightly coupled systems because the time required to transmit messages is relatively short since message are passed at memory speeds. The processor independence, however, of a loosely coupled system is retained since each processor runs its own operating system and must only communicate with another processor to access resources not available locally. It is appreciated that the main processor in the master work station 14 and the processor 22 in the LAN interface module 16 run completely different operating systems.

The protocol of the present invention has been described in the implementation of an intelligent LAN interface module. It is appreciated that the protocol may also be utilized to readily implement other intelligent modules, such as an intelligent data communications module. There is no logical limit to the number of intelligent modules that can be connected to the main processor in the master work station 14 via the work station bus 27. The message synchronization protocol of the present invention offers advantages over the prior art in that it significantly reduces the number of direct interrupt lines on the system bus that would otherwise be required. Generally it would be impractical to provide direct interrupt communication between all processors sharing a system bus in a multiprocessor system. It is appreciated that the architecture described above is extensible so as to support multiple processors interconnected by a system bus.

The present invention provides an efficient mechanism for extending the capabilities of a processor to permit it to reside on a local high speed bus with other processors and for these processors to communicate with one another in an efficient manner by means of message communication and synchronization. The invention implements an efficient message passing system in a multiprocessor environment. The present invention may be utilized for communication between a main processor and plural auxillary processors or between the auxillary processors themselves.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for effecting communication among plural digital processors including a first processor and a second processor, said first and second processors being coupled to a system bus for communication therebetween, said first processor being a transmitting processor and said second processor being a receiving processor, said transmitting processor having a message to be transmitted to said receiving processor, said apparatus having common memory accessible to all said processors, comprising:

a pluarlity of mailbox locations corresponding to said plurality of processors. respectively, in said common memory, said mailbox location corresponding to said transmitting processor being utilized only for transfer of messages from said transmitting processor to receiving processors, said transmitting processor utilizing only said mailbox location corresponding thereto for transfer of messages to receiving processors, means in said transmitting processor for generating said message to be transmitted to said receiving processor and for writing said message into said mailbox location corresponding to said transmitting processor, said message including an address signal representative of said receiving processor, awakening means in said transmitting processor for sending a wake-up interrupt signal to said receiving processor to interrupt said receiving processor so as to alert said receiving processor that it has a pending message.

polling means in said receiving processor for scanning said mailbox locations in response to said wake-up interrupt signal to find an address signal representative of said receiving processor in a mailbox location, said mailbox location thereby having a message therein addressed to said receiving processor, whereby said receiving processor finds said message in said mailbox location having its address signal therein, wherein said awakening means comprises means for transmitting said wake-up interrupt signal from said first processor to said second processor, said second processor having a wake-up interrupt signal input corresponding thereto, said awakening means comprising means in said first processor for generating and transmitting a first type of instruction having an opcode portion, an address portion and a data portion, and converting means, through which said second processor is coupled to said system bus, responsive to said first type of instruction for generating said wake-up interrupt signal for transmission to said wake-up interrupt signal input when said opcode portion designates said first type of instruction, said address portion contains the address of said second processor and said data portion contains a data signal representative of said wake-up interrupt signal.

2. The apparatus of claim 1 in which:
said first type of instruction comprises an input/output write instruction.

3. The apparatus of claim 2 in which:
said data portion of said input/output write instruction comprises a plurality of bits for designating a plurality of interrupt signals, respectively, said wake-up interrupt signal being one of said plurality of interrupt signals, and said second digital processor includes a plurality of interrupt signal inputs corresponding, respectively, to said plurality of said interrupt signals, said wake-up interrupt signal input being one of said plurality of interrupt signal inputs.

4. The apparatus of claim 3 in which said converting means comprises:

a first register having a plurality of stages coupled to said system bus for receiving the respective bits of said data portion, and first decoder means coupled to said system bus and to said first register and responsive to said input/output write instruction for enabling said first register to store said data signal contained in said data portion when said first processor is transmitting said input/output write instruction having said address portion containing said address of said second processor, said stages of said first register providing inputs, respectively, to said interrupt signal inputs of said second processor.

5. The apparatus of claim 4 in which:
said converting means further comprises a second register having a plurality of stages.

6. The apparatus of claim 5 in which:
said second processor includes means for generating and transmitting an input/output write instruction having an address portion containing the address of said second register and a data portion containing a data signal comprising a plurality of bits designating a plurality of further interrupt signals, respectively, said first processor having a plurality of further interrupt signal inputs corresponding, respectively, to said plurality of further interrupt signals.

7. The apparatus of claim 6 in which:

said converting means includes second decoder means coupled to said second processor and responsive to said input/output write instruction transmitted thereby for enabling said second register to store said data signal contained in said data portion of said input/output write instruction transmitted thereby when said input/output write instruction is transmitted by said second processor having said address portion which contains said address of said second register, said stages of said second register providing said further interrupt signals to said system bus for transmission to said further interrupt signal inputs, respectively, of said first processor.

8. The apparatus of claim 7 in which:
said first processor includes means for generating and transmitting on said system bus a second type of instruction having an address portion containing an address representative of said second processor.

9. The apparatus of claim 8 in which:
said second type of instruction comprises an input/output read instruction, and said converting means includes third decoding means responsive to said input/output read instruction for controlling the placing of said outputs of said stages of said second register onto said system bus for transmission to said first processor when said means in said first processor transmits, on said system bus, said input/output read instruction having said address portion which contains said address representative of said second processor.

10. The apparatus of claim 1 in which each said mailbox location includes:

an addressee field for storing said address signal, a pointer field for storing a pointer to a block of data, a data field for storing a size signal representative of the size of said block, and a function code field for storing a function code signal representative of an operation to be performed by said second processor with respect to said communication.

11. The apparatus of claim 10 in which said second processor has a message to be transmitted to said first processor further including:

means in said second processor for generating said message to be transmitted to said first processor and writing said message into said mailbox location corresponding to said second processor, said message including an address signal representative of said first processor, awakening means in said second processor for sending an interrupt signal to said first processor to interrupt said first processor so as to alert first processor that it has a pending message, and polling means in said first processor for scanning said mailbox locations to find an address signal representative of said first processor in a mailbox location, said mailbox location thereby having a message therein addressed to said first processor, whereby said first processor finds said message in said mailbox location having its address signal therein.

12. The apparatus of claim 11 further including:
means in said second processor for clearing said mailbox location associated with said first processor when said communication is completed, and means in said first processor for clearing said mailbox location associated with said second processor when said communication is completed.

* * * * *